INVENTOR
JOHN E. DIGNAM
BY
Carl Miller
ATTORNEY

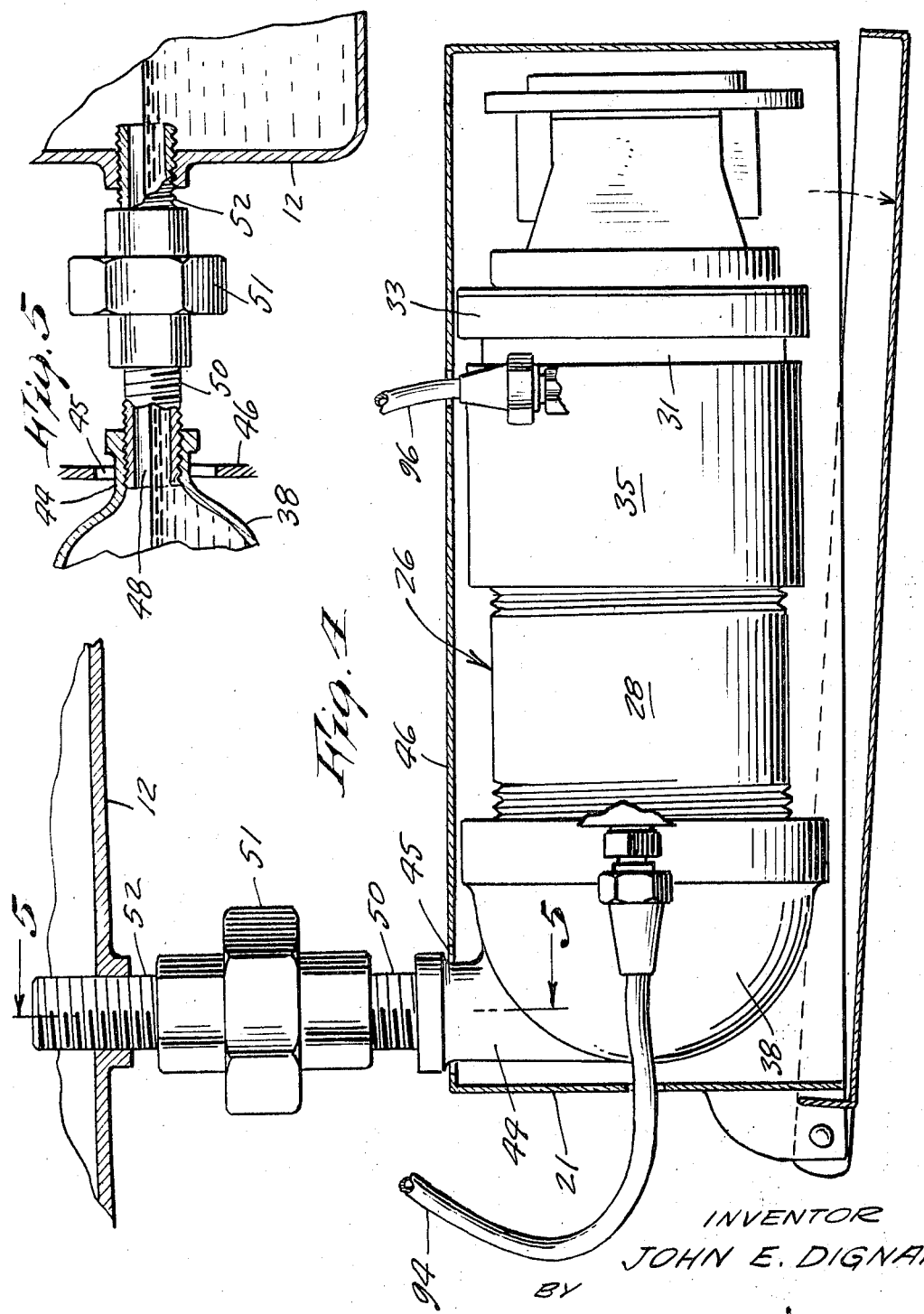

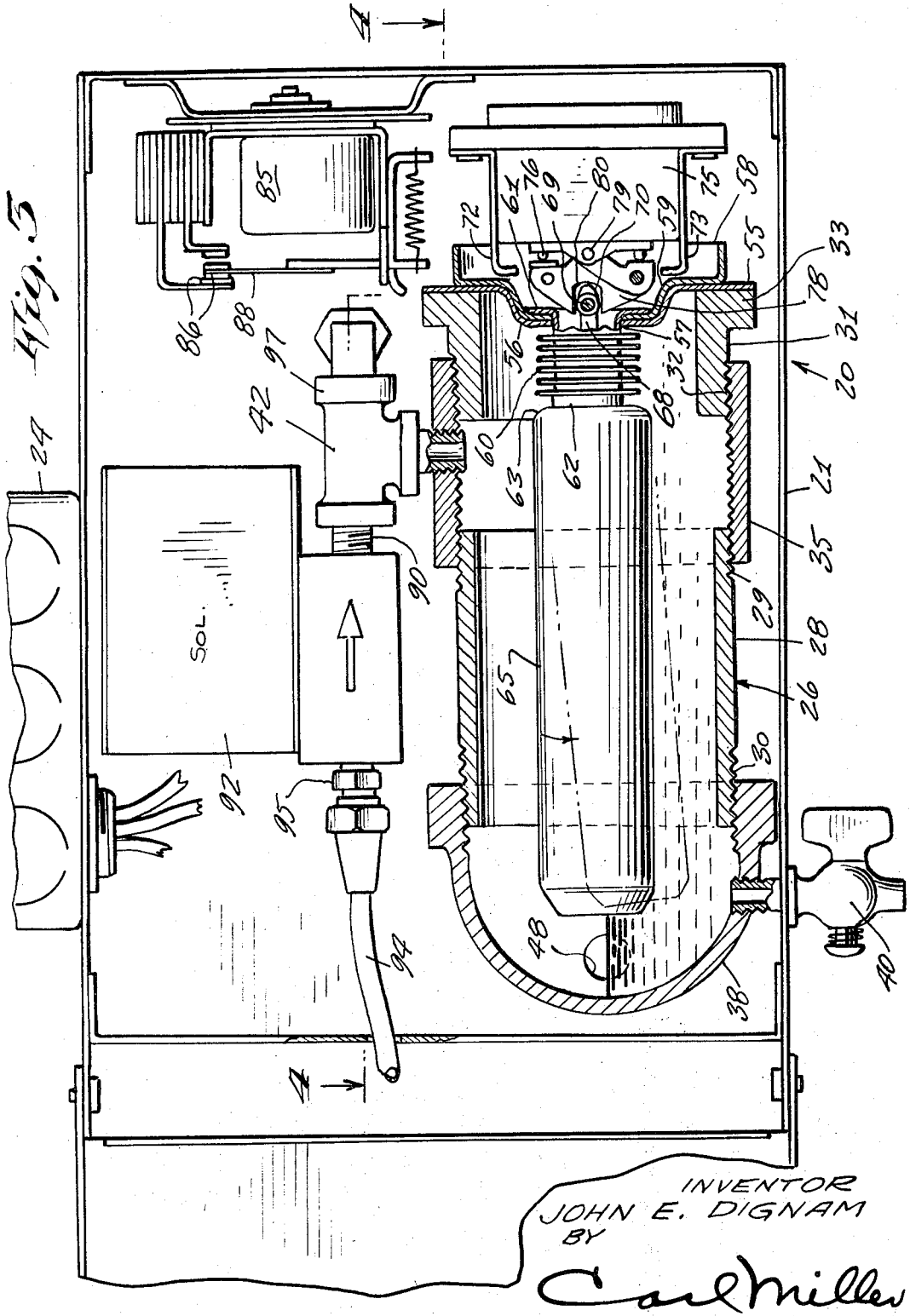

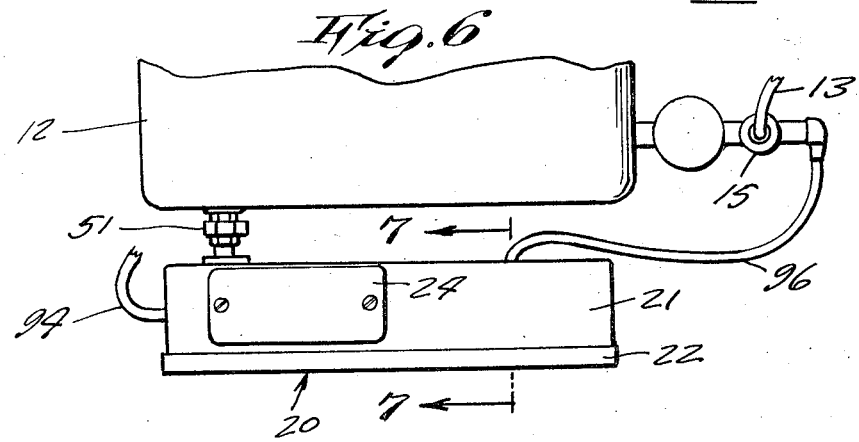
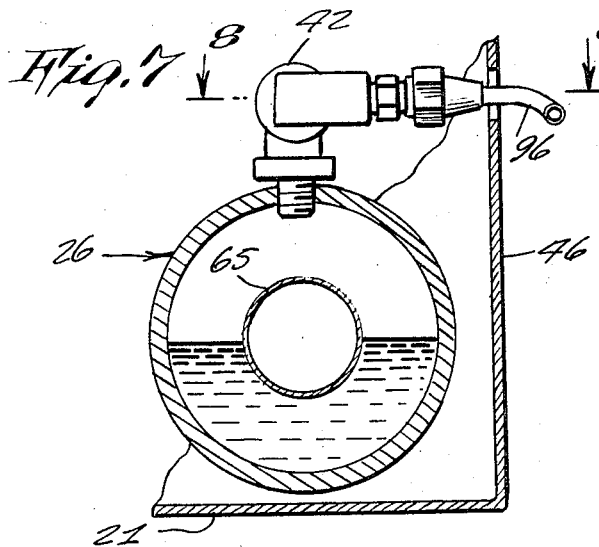
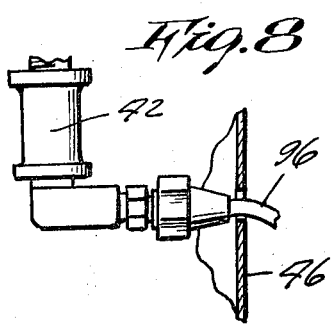
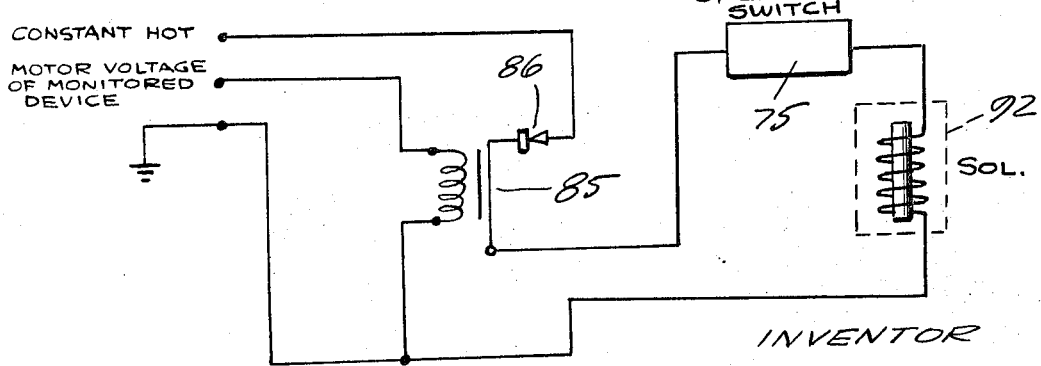
INVENTOR
JOHN E. DIGNAM
BY
Carl Miller
ATTORNEY

United States Patent Office 3,424,193
Patented Jan. 28, 1969

3,424,193
AUTOMATIC FUEL OIL LEVEL CONTROL FOR SUPPLY TO AN OIL BURNER
John E. Dignam, c/o Ion-Tronic Corporation of America, 100 Dobbin St., Brooklyn, N.Y. 11222
Filed Jan. 15, 1968, Ser. No. 697,867
U.S. Cl. 137—389
Int. Cl. F16k *33/00, 31/18*
10 Claims

ABSTRACT OF THE DISCLOSURE

An oil level control unit for the supply of fuel oil to a low pressure air-atomizing oil burner provided with an auxiliary oil supply reservoir from which oil under pressure is delivered to the atomizer of the oil burner. The control unit consists of an auxiliary float tank having therewithin a float lever operatively connected to a microswitch to close the circuit therethrough when the float lever drops. The float tank is directly connected to the oil supply reservoir so as to have a common oil level therewith. A solenoid valve mounted on the float tank is connected to a main source of oil supply and controls the admission of oil into the float tank, the solenoid valve being normally closed. A relay is connected in series with the micro-switch for controlling the circuit to the solenoid valve, the relay further being connected to the current source to the motor of the oil burner. On a drop of the oil level in the float tank and a shutting down of the oil burner motor, the micro-switch and relay will operate to permit current to flow to the solenoid valve to actuate the same to open position so as to permit delivery of oil to the float tank and to the auxiliary reservoir. On elevation of the float lever to its normal horizontal position, the micro-switch will be open and the relay contacts will return to their normal closed engagement thus cutting off the circuit to the solenoid valve.

---

This invention relates to low pressure air-atomizing oil burners and more particularly to a control unit for attachment thereto operative to insure a constant level of oil supply to the burner.

The primary object of this invention is to provide a pressurized oil container having a common oil level with an auxiliary oil supply reservoir of the oil burner including automatic electrical operated valve means for admitting to the pressurized oil container a required amount of oil from a remote source of oil supply whenever the established oil level in the container and reservoir drops.

Another object of this invention is to admit the oil through gravity flow or pressure on an "off" cycle of the oil burner being monitorized, maintaining positive interlock to prevent feeding during pressure run of the monitorized oil burner.

A further object of this invention is to provide a solenoid valve mounted on the oil container and connected to the source of oil supply, the opening and closing of the solenoid valve being effected by a float lever in the oil container controlling a micro-switch in series with a relay electrically connected to the motor current source of the oil burner motor, the wiring being such that when the motor is energized the normally closed contacts of the relay will be open and thus holding the circuit to the solenoid valve open and the solenoid valve closed precluding delivery of oil to the oil container.

Yet another object of this invention relates to closing of the circuit through the micro-switch when the oil level in the oil container drops by the action of the float lever also dropping to effect through the relay contacts which are closed to supply current to the solenoid valve to open the same to allow additional oil to be delivered into the oil container.

A still further object of the invention is to utilize a solenoid valve having a built in time delay to permit complete pressure release in the system before the delivery of the additional oil into the oil container.

Another object of this invention is to incorporate all of the control parts of solenoid valve, oil container, microswitch and relay within an enclosure or housing having a junction box for the electrical wiring and a door to permit access for repair or replacement all to the end of providing a compact control unit that is exceedingly simple to attach to a conventional oil burner.

A further object of the invention is to provide an oil level automatic control unit that will preclude poor control of oil break down and splattering of the vital air and oil handling parts at the front end of the burner thus obviating poor combustion, smoke and air pollution and reducing to a minimum the need to disassemble and clean the oil burner.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

FIGURE 3 is an elevational view partly in section of the parts making up the control unit as mounted within the housing of the control unit.

FIGURE 4 is a sectional view through the control unit housing taken on line 4—4, FIGURE 3.

FIGURE 5 is a detail sectional view taken on line 5—5, FIGURE 4.

FIGURE 6 is a plan view of the parts of FIGURE 2, in their final connected operative relationship.

FIGURE 7 is a detail cross-sectional view taken on line 7—7, FIGURE 6.

FIGURE 8 is a detail view taken on line 8—8, FIGURE 7.

FIGURE 9 shows the wiring diagram of the control unit.

Figures 1, 2:
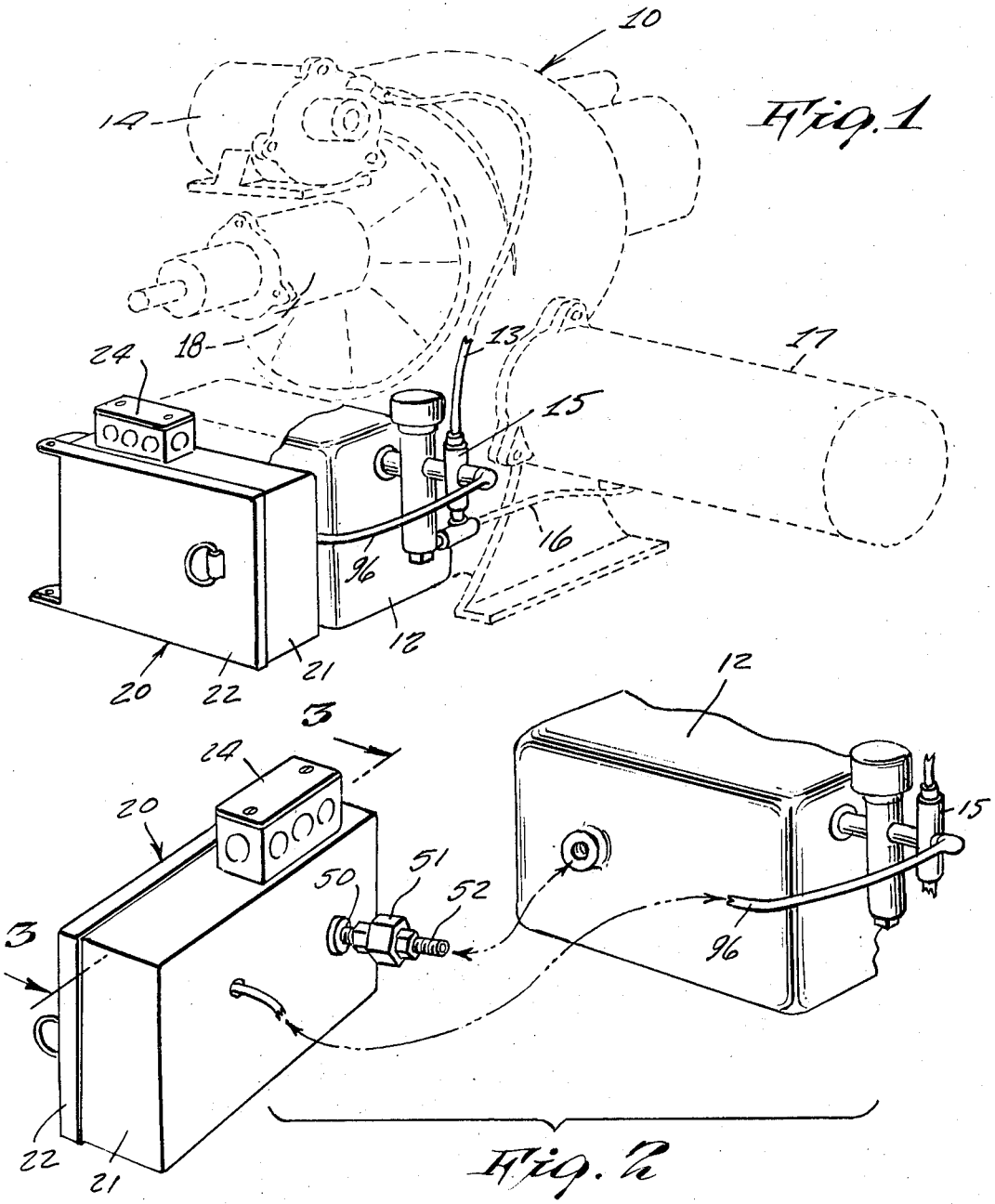
FIGURE 1 is a perspective view showing the oil level control unit attached to an oil burner.
FIGURE 2 is a perspective exploded view showing the relationship and connection of the control unit to the auxiliary reservoir of the oil burner.

As shown in FIGURE 1, the oil burner apparatus 10 which is a low pressure air-atomizing gun type burner is provided with an oil feed reservoir 12. Oil under pressure is delivered through conduit 13 from pump 14 to a feed valve device 15 for delivery into reservoir 12. The pump 14 is connected to an oil supply source (not shown). A conduit 16 delivers the pressurized oil from feed reservoir 12 to the atomizing nozzle (not shown) at the front end of the oil burner gun 17. The air required for mixing with the atomized oil is supplied by a motor driven fan 18. This type of oil burner with its attendant electric controls is motor driven and is well known in the oil burner art and forms no part of the present invention.

For use with the oil burner 10 and directly connected to the feed reservoir 12 is an automatic oil level control unit 20. The control unit 20 consists of a housing 21 provided with a hinged door 22 in which the control apparatus (to be hereinafter described) is housed. The door 22 provides for easy access to the control apparatus for inspection and repair and/or replacement of parts. A junction box 24 is mounted on top of the housing 21 in which all electric wiring of the control unit (to be hereinafter described) is terminated for suitable connection to the motor of the oil burner and to a source of electric supply.

The control apparatus of control unit 20 is shown in assembled relation in FIGURE 3 as contained within housing 21. Suitably mounted within housing 21 at its bottom is an oil float tank 26 formed of a cylindrical center portion 28 threaded at its ends as at 29, 30. A forward cylindrical head 31 is threaded at its rear end as at 32 and is provided at its forward end with a radial flange 33. Connecting head 31 with center portion 28 is an internally threaded sleeve 35. At the rear end of float tank 26 is a domed or semi-spherical back 38 threadedly connected to the threaded end 30 of center portion 28. The threaded connections of back 38, center portion 28, sleeve 35 and head 31 are such as to insure a completely fluid tight (leak proof) seal therebetween. Fitted to the back 38 is a hand operated drain valve 40 which extends downwardly therefrom and outwardly from the bottom of housing 21. At the top of the float tank 26 (which is horizontally disposed) is a T-connection 42 fitted to the top part of sleeve 35 (for a purpose to be hereinafter described). A laterally extending neck 44 integral with domed back 38, see FIGURE 4, projects outwardly through an opening 45 in the housing rear wall 46. The neck 44 is internally threaded at its outer end and provides an inlet passage 48, see FIGURE 3, into float tank 26. A nipple 50 of a union connection 51 is connected to neck 44, the other nipple 52 of the union 51 being connected to the outer wall of feed reservoir 12, it being understood that the housing 21 is mounted adjacent thereto in the manner as shown in FIGURE 1.

Removably secured in any desired manner to the forward face of the head flange 33 and in fluid tight sealing engagement therewith is a sheet metal cap 55 having a central axial recessed bottom 56 provided with an axial opening 57. A sheet metal flanged support 58 having a central projecting portion 59 complemental to the recessed bottom 56 and a corresponding axial opening is seated within the cap and secured thereto in any desired manner as by welding. One end of a flexible metallic corrugated sleeve 60 extends through the registering openings of the cap 56 and support 58 in friction tight engagement therewith, and is provided with a terminal radial flange 61 abutting the forward face of support bottom 59 and is fluid tight secured thereto in any desired manner. The other end 62 of the corrugated sleeve 60 is fluid tight secured in any suitable manner to the forward end 63 of a hollow float lever 65. The length of the float lever 65 is such that its rear end lies closely adjacent passage 48 and in its normal horizontal position its longitudinal axis coincides substantially with the axis of float tank 26, see FIGURE 3. Rigidly and axially secured to the forward end 63 of float lever 65 is a forwardly extending lever arm 68 having its forward end fulcrumed to flanged support 58 on pin 69. Beyond pin 69, the lever arm 68 terminates in a cam 70.

Supported by arms 72, 73 on flanged support 58 is a micro-switch 75 having an upper switch closing plunger 76. A swing yoke 78 is fulcrumed as at 79 such as to depress plunger 76 when moved clockwise. A cam slot 80 on the swing yoke receives the fulcrumed end of float lever 68 with its terminal cam 70. It is thus seen that when float lever 65 drops from its normal horizontal position the cam 70 will engage the upper wall of cam slot 80 to swing the yoke 78 clockwise to depress plunger 76. Depression of plunger 76 will effect closing of the circuit controlled by the micro-switch 75.

Within the housing 21 and located above the micro-switch 75 is a relay mechanism 85 having opposed contacts 86, one of which is on a movable arm 88.

Connected by a nipple 90 to the inlet end of T-connection 42, see FIGURE 3, is a solenoid valve 92. The solenoid valve 92 is of the time delay type, in that electrical resistance in its field coil will slowly build up until the valve opens, the time delay approximating four seconds, this for a purpose to be hereinafter described. An oil feed conduit 94 connects a source of fuel oil supply (not shown) to the inlet 95 of the solenoid valve 92 and a conduit 96 connects the outlet end 97 of T-connection 42 to the feed valve device 15 of the oil burner, the conduit 96 serving as a pressure equalizer.

The necessary wiring connected to micro-switch 75, relay 85 and solenoid valve 92 is shown in the wiring diagram, FIGURE 9, and are brought together in the terminal or junction box 24 for appropriate connection to the motor of the oil burner and the source of electric supply. Current supplied to solenoid valve 92 will first be passed through float operated micro-switch 75, then in series through normally closed contact 86 of a 115 or 220 volt relay 85. The field coil to actuate the relay 85 is wired to the motor current source of the oil burner motor, so that when this motor is energized the normally closed contact 86 will be open, thus preventing the circuit to the solenoid valve from being completed. When the micro-switch plunger 76 is depressed depending on the float lever 65 dropping on a drop of the oil level in tank 26 and the oil burner motor shuts down, the circuit controlled by the micro-switch 75 is closed and the relay contact 86 will then be closed thus allowing current to flow to the solenoid valve controlling the inlet liquid. Opening of the solenoid valve 92 will then permit the flow of oil into T-connection 42 for discharge into tank 26 and through passage 48 into oil burner reservoir 12. Due to the solenoid valve 92 being of the time delay type, pressure within the oil parts of the monitorized oil burner will be cleared (the time delay being approximately four seconds to complete pressure release) before additional oil from inlet conduit 94 is allowed to flow.

It is thus seen that the basic function of the control unit is to automatically supervise the required oil level which will change due to normal usage of the monitorized oil burner. Without the same, when oil supply fails the atomizing pressure falls off, resulting in poor control of oil breakdown and a consequent splattering of the vital air handling parts of the front end of the burner that are responsible for clean burning. It follows that because a dirty front end of the oil burner must result in poor combustion and the production of smoke and air pollution, that the maintaining of a proper oil level will greatly curtail this detrimental process, as well as greatly reducing the need to disassemble and clean the oil burner parts.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having described my invention, what I claim as new and desire to secure by Letters Patent is:

1. A control unit for monitoring the oil level supply to a low pressure electric motor driven air-atomizing oil burner having an auxiliary oil supply reservoir comprising:
 (a) a housing for said control unit,
 (b) a float tank in said housing,
 (c) a pipe connection between said float tank and the supply reservoir for establishing a common oil level therebetween,
 (d) a switch means supported by said float tank,
 (e) a float lever within said float tank,
 (f) pivot means on said float tank providing a fulcrum for said float lever in proximity to said switch means,
 (g) coacting means on said float lever and switch means operative on a drop of said float lever occasioned by a lowering of the oil level in said float tank to close said switch means,
 (h) a solenoid valve attached to said float tank for controlling delivery of oil thereinto, (i) conduit means connecting said solenoid valve to a source of oil supply, (j) circuit means including a relay connected to said switch means and to the supply circuit for said electric motor, whereby with said switch means open said relay will act on the circuit means to de-energize the solenoid of the solenoid valve, and with said switch means closed by the action of the float lever said relay will act on the circuit means to energize the solenoid of the solenoid valve to open the valve and admit oil into said float tank.

2. The control unit of claim 1, wherein:
(a) said switch means is a micro-switch,
(b) said float tank being a substantially cylindrical horizontally positioned container,
(c) said micro-switch being mounted on the front end of said float tank,
(d) a swing yoke pivotally supported on said micro-switch,
(e) there being a slot in said swing yoke,
(f) said float lever being elongated and having a cam formation at its forward end lying within said slot,
(g) the pivot means of said float lever extending transversely across said slot, and
(h) said swing yoke operative on clockwise movement effected by the drop of the float lever having its cam end riding on a wall of the slot to close said micro-switch.

3. The control unit of claim 2, wherein:
(a) the front end of said tank is open,
(b) cap means closing the front end of the float tank,
(c) said pivot means being supported by said cap means,
(d) there being a central opening in said cap means through which the forward end of the float lever extends, and
(e) a flexible corrugated sleeve surrounding the forward end of the float lever and secured at its ends respectively to said float lever and cap means to effect an oil tight seal while providing for swinging movement of the float lever.

4. The control unit of claim 3, including:
(a) a T-pipe connection attached to the top of the float tank and opening thereinto,
(b) said solenoid valve at its outlet end being connected to one side of said T-pipe connection, and
(c) a pressure equalizer conduit adapted to connect the other side of said T-pipe connection to the feed valve device of the oil burner.

5. The control unit of claim 4, wherein:
(a) said solenoid valve is a time delay valve in which when the solenoid is energized the electrical resistance to the field coil will slowly build up whereby the valve will open after a predetermined time interval.

6. The control unit of claim 5, wherein the pipe connection between the float tank and the supply reservoir is at the rear end of the float tank and comprises,
(a) a lateral tubular internally threaded extension integral with the rear portion of the float tank and projecting outwardly through the back wall of the housing,
(b) a nipple fitted to said tubular extension,
(c) a nipple fitted to said supply tank, and
(d) a union connection interconnected with both said nipples.

7. The control unit of claim 6, including:
(a) a drain valve connected to the bottom of said float tank and located outwardly below the bottom wall of said housing.

8. The control unit of claim 7, including:
(a) a junction box mounted on the top wall of the housing serving to contain the terminal connections of the wiring of said control unit parts.

9. The control unit of claim 8, including:
(a) a door constituting the front wall of said housing and proving access to the interior thereof for servicing the control unit parts.

10. The control unit of claim 9, wherein:
(a) said float lever is a rectilinear hollow member of a length such that its rear end lies closely adjacent to the passage into said float tank provided by said lateral tubular extension.

References Cited

UNITED STATES PATENTS

| | | | |
|---|---|---|---|
| 1,346,898 | 7/1920 | Kingsbury | 137—412 X |
| 1,914,541 | 6/1933 | Teesdale | 137—389 X |
| 1,985,659 | 12/1934 | Hickstein et al. | 137—428 X |
| 2,859,759 | 11/1958 | Hurwitz | 137—412 X |

FREDERICK L. MATTESON, JR., *Primary Examiner.*

R. A. DUA, *Assistant Examiner.*

U.S. Cl. X.R.

137—412, 428